US009075599B2

(12) United States Patent
Hickey et al.

(10) Patent No.: US 9,075,599 B2
(45) Date of Patent: Jul. 7, 2015

(54) OPCODE SPACE MINIMIZING ARCHITECTURE UTILIZING A LEAST SIGNIFICANT PORTION OF AN INSTRUCTION ADDRESS AS UPPER REGISTER ADDRESS BITS

(75) Inventors: Mark J. Hickey, Rochester, MN (US); Adam J. Muff, Rochester, MN (US); Matthew R. Tubbs, Rochester, MN (US); Charles D. Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 1160 days.

(21) Appl. No.: 12/894,697

(22) Filed: Sep. 30, 2010

(65) Prior Publication Data
US 2012/0084535 A1      Apr. 5, 2012

(51) Int. Cl.
 G06F 9/345     (2006.01)
 G06F 9/30      (2006.01)
 G06F 9/38      (2006.01)

(52) U.S. Cl.
 CPC .......... *G06F 9/30098* (2013.01); *G06F 9/3016* (2013.01); *G06F 9/30181* (2013.01); *G06F 9/345* (2013.01); *G06F 9/3824* (2013.01)

(58) Field of Classification Search
 CPC ....... G06F 9/3016; G06F 9/34; G06F 9/3824; G06F 9/345; G06F 9/30098; G06F 9/30101
 USPC ................................................ 712/208, 220
 See application file for complete search history.

(56) References Cited

U.S. PATENT DOCUMENTS

| 5,897,665 | A * | 4/1999 | Padwekar ..................... 711/212 |
| 6,157,996 | A * | 12/2000 | Christie et al. ................ 712/218 |
| 6,625,724 | B1 * | 9/2003 | Kahn et al. .................... 712/229 |
| 7,373,483 | B2 * | 5/2008 | Henry et al. .................. 712/210 |
| 8,166,281 | B2 * | 4/2012 | Gschwind et al. ............. 712/216 |
| 2011/0283090 | A1 * | 11/2011 | Mejdrich et al. .............. 712/208 |

OTHER PUBLICATIONS

IBM U.S. Appl. No. 12/546,071 entitled "Offset Based Register Address Indexing," filed Aug. 24, 2009 by Eric O. Mejdrich et al.
IBM U.S. Appl. No. 12/778,635 entitled "Instruction Addressing Using Register Address Sequence Detection," filed May 12, 2010 by Eric O. Mejdrich et al.

* cited by examiner

*Primary Examiner* — David J Huisman
(74) *Attorney, Agent, or Firm* — James R. Nock

(57) ABSTRACT

Due to the ever expanding number of registers and new instructions in modern microprocessor cores, the address widths present in the instruction encoding continue to widen, and fewer instruction opcodes are available, making it more difficult to add new instructions to existing architectures without resorting to inelegant tricks that have drawbacks such as source destructive operations. The disclosed invention utilizes specialized decode and address calculation hardware that concatenates a fixed number of least significant bits of the instruction address onto the most significant side of each register address portion contained in the instruction, yielding the full register address, instead of providing the full register address widths for every register used in the instruction. This frees up valuable opcode space for other instructions and avoids compiler complexity. This aligns nicely with how most loops are unrolled in assembly language, where independent operations are near each other in memory.

4 Claims, 6 Drawing Sheets

(ILLUSTRATED INSTRUCTION FIELDS NOT SHOWN TO SCALE)

OPCODE SPACE MINIMIZING ARCHITECTURE UTILIZING A LEAST SIGNIFICANT PORTION OF AN INSTRUCTION ADDRESS AS UPPER REGISTER ADDRESS BITS

FIELD OF THE INVENTION

The invention is generally related to data processing, and in particular to processor architectures and execution units incorporated therein.

BACKGROUND OF THE INVENTION

The fundamental task of every computer processor is to execute computer programs. How a processor handles this task, and how computer programs must present themselves to a processor for execution, are governed by both the instruction set architecture (ISA) and the microarchitecture of the processor. An ISA is analogous to a programming model, and relates principally to how instructions in a computer program should be formatted in order to be properly decoded and executed by a processor, although an ISA may also specify other aspects of the processor, such as native data types, registers, addressing modes, memory architecture, interrupt and exception handling, and external I/O. The microarchitecture principally governs lower level details regarding how instructions are decoded and executed, including the constituent parts of the processor (e.g., the types of execution units such as fixed and floating point execution units) and how these interconnect and interoperate to implement the processor's architectural specification.

An ISA typically includes a specification of the format of each type of instruction that is capable of being executed by a particular processor design. Typically, an instruction will be encoded to include an opcode that identifies the type of instruction, as well as one or more operands that identify input and/or output data to be processed by the instruction. In many processor designs, for example Reduced Instruction Set Computer (RISC) and other load-store designs, data is principally manipulated within a set of general purpose registers (GPR's) (often referred to as a "register file"), with load and store instructions used to respectively retrieve input data into GPR's from memory and store result or output data from GPR's and back into memory. Thus, for a majority of the instructions that manipulate data, the instructions specify one or more input or source registers from which input data is retrieved, and an output or destination register to which result data is written.

Instructions are typically defined in an ISA to be a fixed size, e.g., 32 bits or 64 bits in width. While multiple 32 or 64-bit values may be used to specify an instruction, the use of multiple values is undesirable because the multiple values take more time to propagate through the processor and significantly increase design complexity. With these fixed instruction widths, only a limited number of bits are available for use as opcodes and operands.

Each unique instruction type conventionally requires a unique opcode, so, in order to support a greater number of instruction types (a continuing need in the industry), additional bits often must be allocated to the opcode portion of an instruction architecture. In some instances, opcodes may be broken into primary and secondary opcodes, with the primary opcode defining an instruction type and the secondary opcode defining a subtype for a particular instruction type; however, even when primary and secondary opcodes are used, both opcodes occupy bit positions in each instruction.

Likewise, a continuing need exists for expanding the number of registers supported by an ISA, since improvements in fabrication technology continue to enable greater numbers of registers to be architected into an integrated circuit, and in general performance improves as the number of registers increases.

Each register requires a unique identifier as well, so as the number of registers increases, the number of bit positions in each instruction required to identify all supported registers likewise increases.

As an example, consider a processor architecture that supports 32-bit instructions with 6-bit primary opcode fields, and thus supports a total of 64 types, or classes of instructions. If, for example, it is desirable to implement within this architecture a class of instructions that identifies up to three source registers and a separate destination register from a register file of 64 registers, each operand requires a 6-bit operand field. As such, 6 bits are needed for the primary opcode, 18 bits are needed for the source register addresses and 6 bits are needed for the target register address, leaving only 2 bits for an extended opcode, and allowing for only four possible instructions in this instruction class.

In most instances, however, more instruction types are needed for an architecture to be useful. For instance, an instruction class for performing floating point operations may need instruction types that perform addition, subtraction, multiplication, fused multiply-add operations, division, exponentiation, trigonometric operations, comparison operations, and others.

Conventional attempts have been made to address these limitations. For example, three-source operations may be made destructive, meaning the target and one source address would be implicitly equal, such that one address field in the above example would not be needed, freeing up space for additional extended opcodes. Destructive operations, however, are often not convenient for compilers and software engineers, because often times an extra copy of the source data that would be overwritten by the destructive operation needs to be saved away in a temporary register, which can have potential performance problems in addition to using valuable temporary register space.

Therefore, a significant need continues to exist in the art for a manner of increasing the number and complexity of instructions supported by an instruction set architecture.

SUMMARY OF THE INVENTION

The invention addresses these and other problems associated with the prior art by obtaining the most significant portion of the full register address from register address calculation logic, which obtains the most significant portion of the full register address from a least significant portion of the current instruction's instruction address, and concatenates this portion with a portion of the address contained in the instruction, yielding a full register address suitable for addressing data in a large register file. The method of obtaining the most significant portion of the register address from the least significant bits of the instruction address is used as a substitute for storing full register addresses in the instruction. This allows independent instructions to be nestled between dependent ones in the instruction stream without hampering performance and also allowing for optimal secondary opcode space in the instruction.

One major reason why instruction set architectures strive for large numbers of registers is so that loops can be "unrolled" to minimize branch misprediction performance penalties. The large numbers of registers are needed to do spills and fills of data without reusing the same register in a loop. Consider the following example where a long Taylor series approximation is computed for sin(x) with many iterations:

$$\sin(x) \approx x - \frac{x^3}{3!} + \frac{x^5}{5!} - \frac{x^7}{7!} + \frac{x^9}{9!} - \frac{x^{11}}{11!} + \frac{x^{13}}{13!} - \frac{x^{15}}{15!}$$

```
# initially:
# f1, f2, f10 contain x
# f3, f4, f6, f8 contain 1.0
# f7 contains −1.0
loop:   fmul    f2, f1, f2    # f1 contains x, initially f2 contains x also
        fmul    f2, f1, f2    # f2 now contains x raised to the desired exp
        fadd    f3, f3, f6    # increment the counter, initially contains 1
        fmul    f4, f3, f4    # f4 contains the running factorial, init 1
        fadd    f3, f3, f6    # increment the counter
        fmul    f4, f3, f4    # f4 contains the running factorial
        fdiv    f5, f6, f4    # f5 now has the reciprocal of the factorial
        fmul    f8, f7, f8    # flip the sign appropriately
        fmul    f9, f5, f2    # multiply the reciprocal with the x
                              component
        fmadd   f10, f9,      # correct the sign and add to the sum in f10
                f8, f10
        fcmp    f3, end       # compare counter (exponent) to end
        blt     loop          # branch back to loop if f3 < end
```

After loop unrolling twice, the loop may be similar to the below code listing, where registers f1 through f10 are used for the most significant part of the approximation, and f11 thru f20 are used for the least significant (starts with the x13/13! term), and they are summed together at the end.

```
# initially:
# f1, f2, f10 contain x
# f3, f4, f6, f8 contain 1.0
# f7 contains −1.0
# f1, f2, f10 contain x
# f3, f4, f6, f8 contain 1.0
# f7 contains −1.0
# end contains 5
loop:   fmul    f2, f1, f2      # f1 contains x, initially f2 contains x also
        fmul    f12, f11, f12   #
        fmul    f2, f1, f2      # f2 now contains x raised to the desired
                                exp
        fmul    f12, f11, f12   #
        fadd    f3, f3, f6      # increment the counter, initially contains
                                1
        fadd    f13, f13, f16   #
        fmul    f4, f3, f4      # f4 contains the running factorial, init 1
        fmul    f14, f13, f14   #
        fadd    f3, f3, f6      # increment the counter
        fadd    f13, f13, f16   #
        fmul    f4, f3, f4      # f4 contains the running factorial
        fmul    f14, f13, f14   #
        fdiv    f5, f6, f4      # f5 now has the reciprocal of the factorial
        fdiv    f15, f16, f14   #
        fmul    f8, f7, f8      # flip the sign appropriately
        fmul    f18, f17, f18   #
        fmul    f9, f5, f2      # multiply the reciprocal with the x
                                component
        fmul    f19, f15, f12   #
        fmadd   f10, f9, f8,    # correct the sign and add to the sum
                f10             in f10
        fmadd   f20, f19, f18,  # correct the sign and add to the sum
                f20             in f20
        fcmp    f3, end         # compare counter (exponent) to end
        blt     loop            # branch back to loop if f3 < end
        fadd    f10, f10, f20   # sum
```

Note that to minimize branch mispredict penalties and for other performance reasons, this loop would be unrolled further than 2 times typically, but for brevity's sake the example shown above is only unrolled two times. Note that to unroll the loop 4 times, approximately 40 registers would be needed, and this surpasses the limit of 32 registers for many architectures. Notice also that the unrolled target registers and source registers follow a predictable pattern and are interleaved, where instructions calculating the most significant portion (terms x thru $x^{11}/11!$) are on even lines, and the least significant portion (terms $x^{13}/13!$ thru $x^{21}/21!$) are on odd lines. This is intended to avoid dependency stalls between instructions, which hampers performance.

The disclosed invention avoids placing the upper address bits of source and/or target register addresses directly in the instruction itself, as that would use up valuable opcode space. Instead, the upper, most significant address bits are taken from the least significant bits of the address of the instruction. Special instruction decode hardware decodes these special instructions and concatenates a least significant subset of instruction address bits onto the most significant portion of the register address. In this particular implementation of the invention, the least significant 2 bits of the instruction address are concatenated onto the most significant portion of each register address portion contained in the instruction. Instruction addresses are 64 bits in width in this implementation, and numbered from most significant bit 0 to least significant bit 63. Full register addresses are 6 bits in width and numbered from most significant bit 0 to least significant bit 5. In this example, bits 60:61 are concatenated onto the most significant side of each register address portion contained in the instruction, such that bits 60:61 from the instruction address become bits 0:1 of each full register address. Thus, the example above is altered to be unrolled 4 times (only a portion shown for brevity) note the instruction address on the left. The bits of the instruction address that are concatenated with the register addresses from the instruction are shown in bold.

| Instruction Address bits (58:63) | Instruction | | | |
|---|---|---|---|---|
| 0b000000: | zfmul | f2, f1, f2 | # f1 contains x, initially f2 contains x also |
| 0b000000: | zfmul | f34, f33, f34 | # (in memory this looks like zfmul, f2, f1, f2) |
| 0b001000: | zfmul | f66, f65, f66 | # (in memory this looks like zfmul, f2, f1, f2) |
| 0b001100: | zfmul | f98, f97, f98 | # (in memory this looks like zfmul, f2, f1, f2) |
| 0b010000: | zfmul | f2, f1, f2 | # f2 now contains x raised to the desired exp |
| 0b010100: | zfmul | f34, f33, f34 | # (in memory this looks like zfmul, f2, f1, f2) |
| 0b011000: | zfmul | f66, f65, f66 | # (in memory this looks like zfmul, f2, f1, f2) |

-continued

| Instruction Address bits (58:63) | Instruction | | |
|---|---|---|---|
| 0b011100: | zfmul | f98, f97, f98 | # (in memory this looks like zfmul, f2, f1, f2) |
| 0b100000: | zfadd | f3, f3, f6 | # increment the counter, initially contains 1 |
| 0b100100: | zfadd | f35, f35, f38 | # (in memory this looks like zfadd f3, f3, f6) |
| 0b101000: | zfadd | f67, f67, f70 | # (in memory this looks like zfadd f3, f3, f6) |
| 0b101100: | zfadd | f99, f99, f102 | # (in memory this looks like zfadd f3, f3, f6) |
| 0b110000: | zfmul | f4, f3, f4 | # f4 contains the running factorial, init 1 |
| 0b110100: | zfmul | f36, f35, f36 | # (in memory this looks like zfmul f4, f3, f4) |
| 0b111000: | zfmul | f68, f67, f68 | # (in memory this looks like zfmul f4, f3, f4) |
| 0b111100: | zfmul | f100, f99, f100 | # (in memory this looks like zfmul f4, f3, f4) |
| 0b110100: | zfaddb | f10, f10, f42 | # final sum (instr zfaddb uses IA for B only) |
| 0b111000: | zfaddb | f10, f10, f74 | # |
| 0b111000: | zfaddb | f10, f10, f106 | # |

Therefore, consistent with one aspect of the invention, a computer system includes a register file configured to store a target result operand and to retrieve a source operand both addressed by register addresses, an execution unit for executing instructions, where the execution unit is configured to receive the source operand from the register file and write the target result operand into the register file. The computer system also includes a register address calculation logic configured to receive a current instruction address portion associated with a current instruction, a source register address portion and a target register address portion, and to concatenate the current instruction address portion onto the source register address portion and the target register address portion to yield a full source register address corresponding to the source operand and a full target register address corresponding to the target operand. The register address calculation logic is further configured to provide the full source register address and the full target register address to the register file. The computer system also includes an instruction decode logic configured to decode the current instruction and provide the current instruction address portion and the source and target register address portions to the register address calculation logic.

Consistent with another aspect of the invention, a method is provided for executing instructions in a processor, where, in response to receiving an instruction that corresponds to an instruction opcode that contains only a portion of the full register address in lieu of full addresses, the addresses are obtained by concatenating each individual address portion provided in the instruction with a least significant address portion obtained from the current instruction's instruction address to yield full register addresses. The full source and target addresses are then provided to the register file such that operand data can be read from the register file that is associated with the source addresses. This operand data is then used to execute the instruction, and the resultant target data is written into the register file entry associated with the full target address.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

DETAILED DESCRIPTION

Embodiments consistent with the invention utilize register address calculation using current instruction addresses to generate full register addresses suitable for usage by large register files. A portion of the full address is obtained from the instruction while the remainder of the full address is obtained from the current instruction address by register address calculation logic. The two portions are concatenated and sent to the execution unit to begin execution.

The hereinafter described embodiments allow for much greater opcode space in fixed instruction width architectures by using register address offsets that occupy fewer bits than the full source addresses, thereby freeing up more bits in the instruction for opcode space.

Other modifications will become apparent to one of ordinary skill in the art having the benefit of the instant disclosure.

Hardware and Software Environment

Figure 1:
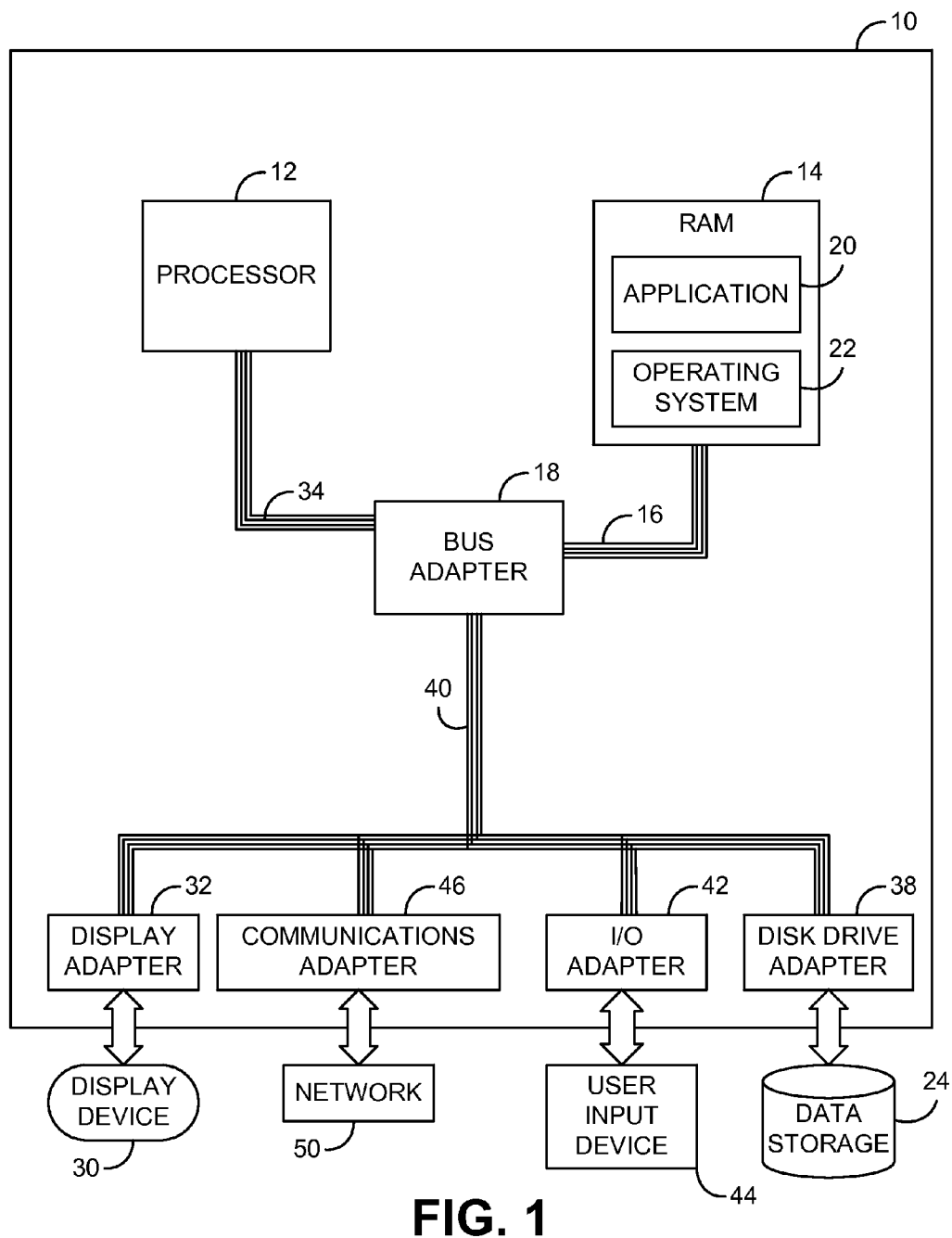
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as a random access memory 14 ('RAM'), which is connected through a high speed memory bus 16 and a bus adapter 18 to processor 12 through a processor bus 34.

Stored in RAM 14 is an application 20, a module of user-level computer program instructions for carrying out particular data processing tasks such as, for example, word processing, spreadsheets, database operations, video gaming, stock market simulations, graphics simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on data storage such as a disk drive 24.

Computer 10 of FIG. 1 includes a disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling input and output to and from user input devices 44 such as keyboards and mice. In addition, computer 10 includes a communications adapter 46 for data communications with a data communications network 50. Such data communications may be carried out serially through RS-232 connections, through external buses such as a Universal Serial Bus ('USB'), through data communications networks such as IP data communications networks, and in other ways as will occur to those of skill in the art. Communications adapter 46 implements the hardware level of data communications through which one computer sends data communications to another computer, directly or through a data communications network. Examples of communications adapter 46 suitable for use in computer 10 include but are not limited to modems for wired dial-up communications, Ethernet (IEEE 802.3) adapters for wired data communications network communications, and 802.11 adapters for wireless data communications network communications. Computer 10 also includes a display adapter 32 which facilitates data communication between bus adapter 18 and a display device 30, allowing application 20 to visually present output on display device 30.

Figure 2:
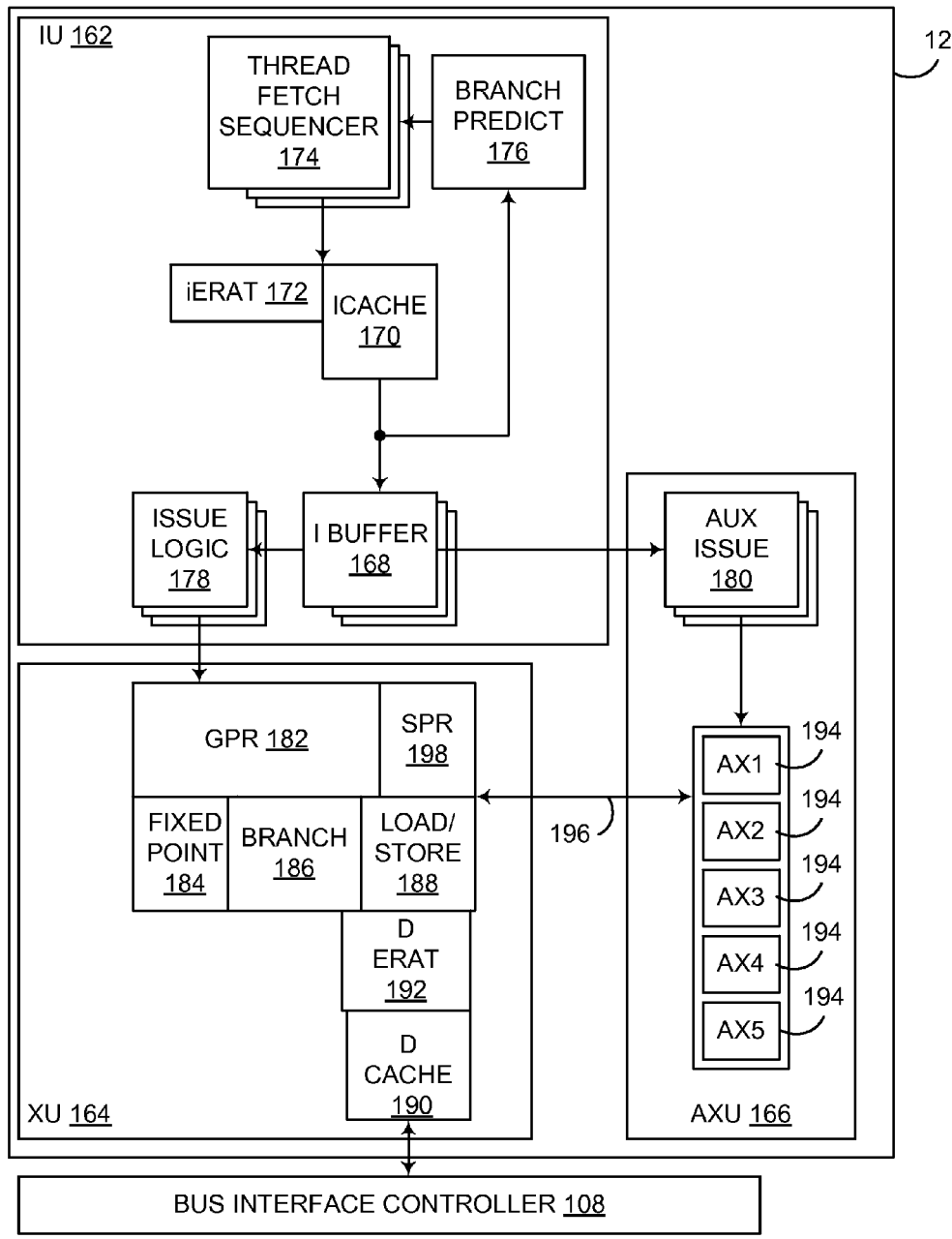
FIG. 2 is a block diagram illustrating in greater detail an exemplary implementation of the processor in FIG. 1.

FIG. 2 next illustrates in detail one exemplary implementation of a processor 12 consistent with the invention, implemented as a processing element partitioned into an instruction unit (IU) 162, an execution unit (XU) 164 and an auxiliary execution unit (AXU) 166. In the illustrated implementation, IU 162 includes a plurality of instruction buffers (I Buffer) 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory, through a bus interface controller 108. Each thread fetch sequencer 174 is dedicated to a particular hardware thread, and is used to ensure that instructions to be executed by the associated thread is fetched into the iCACHE 170 for dispatch to the appropriate execution unit. As also shown in FIG. 2, instructions fetched into instruction buffer 168 may also be monitored by branch prediction logic 176, which provides hints to each thread fetch sequencer 174 to minimize instruction cache misses resulting from branches in executing threads.

IU 162 also includes a plurality of issue logic blocks 178 and is configured to resolve dependencies and control the issue of instructions from instruction buffer 168 to XU 164. In addition, in the illustrated embodiment, a plurality of separate auxiliary instruction issue logic blocks 180 is provided in AXU 166, thus enabling separate instructions to be concurrently issued by different threads to XU 164 and AXU 166. In an alternative embodiment, (not illustrated) auxiliary instruction issue logic 180 may be disposed in IU 162, or may be omitted in its entirety, such that issue logic 178 issues instructions to AXU 166.

XU 164 is implemented as a fixed point execution unit, including a general purpose register (GPR) 182 and a special purpose register (SPR) 198 both coupled to fixed point logic 184, a branch logic 186 and a load/store logic 188. Load/store logic 188 is further coupled to an L1 data cache (dCACHE) 190, with effective to real translation provided by a dERAT logic 192. XU 164 may be configured to implement practically any instruction set, e.g., all or a portion of a 32b or 64b Power™ Architecture instruction set.

AXU 166 operates as an auxiliary execution unit including the auxiliary instruction issue logic 180 along with one or more execution blocks 194. AXU 166 may include any number of execution blocks, and may implement practically any type of execution unit, e.g., a floating point unit, or one or more specialized execution units such as encryption/decryption units, generic coprocessors, cryptographic processing units, vector processing units, graphics processing units, XML processing units, etc. In the illustrated embodiment, AXU 166 includes high speed auxiliary interface 196, to facilitate high speed communication between AXU 166 and XU 164, e.g., to support direct moves between AXU register contents and XU register contents and other high speed communication between execution units.

Register Address Calculation Logic in an Issue Unit

Figure 3:
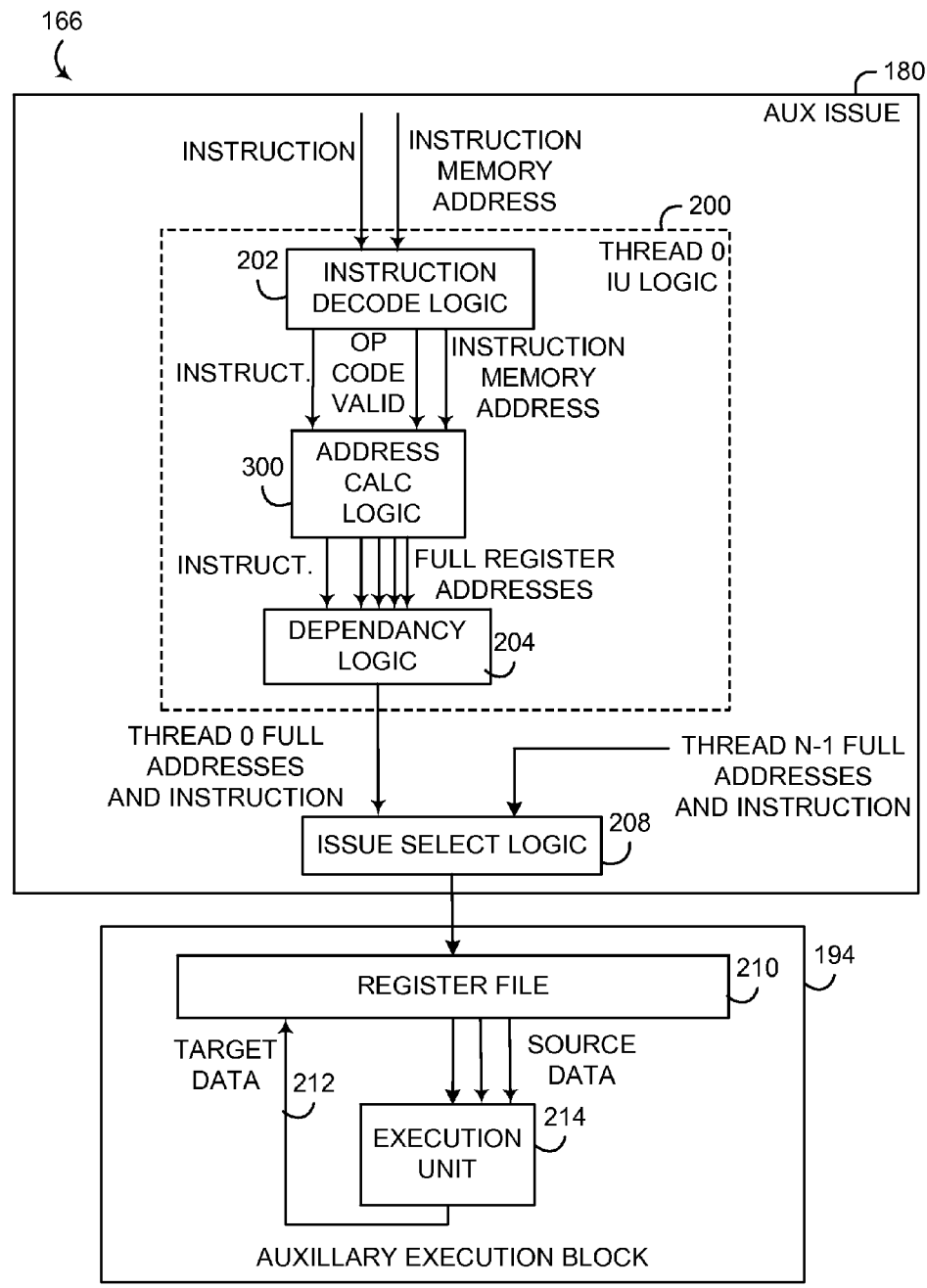
FIG. 3 is a block diagram illustrating an exemplary implementation of an auxiliary instruction issue and execution logic consistent with the invention, and capable of being implemented within the processor of FIG. 2.

FIG. 3 illustrates in further detail an exemplary AXU 166 suitable for implementation inside of processor 12 in FIG. 2. AXU 166 is configured with auxiliary instruction issue logic 180, which is configured to select fair issuance of instructions from multiple threads using an issue select logic 208, which in turn issues instructions from the selected thread to an auxiliary execution block 194. AXU 166 is also configured to decode instructions for each thread with an instruction decode logic 202. Instruction decode logic 202 decodes instructions from its associated thread to determine if the current instruction supports register address calculation using current instruction address consistent with embodiments of the invention. In addition, instruction decode logic 202 obtains one or more address portions from the instruction and provides them to address calculation logic 300. Instruction decode logic 202 also passes along a portion of the instruction address associated with that thread's current instruction.

Address calculation logic 300 is configured to generate full register addresses by concatenating the least significant bits of the current instruction's address onto the most significant portion of each register address portion obtained from the instruction, and provide the full addresses and the instruction to dependency logic 204. Dependency logic 204 is configured to resolve dependencies between instructions by stalling dependent instructions for the appropriate number of cycles, and pass the instruction and associated full addresses to issue select logic 208.

Issue select logic 208 is configured to select fair issuance of instructions from available threads in the design, and issue instructions and full register addresses to auxiliary execution block 194. Auxiliary execution block 194 includes a register file 210 coupled to an execution unit 214. Register file 210 includes an array of registers, each of which are accessed by a unique address. For example, register file 210 may be implemented to support 64 registers, each accessed by a unique full 6-bit address. It will be appreciated that different numbers of registers may be supported in different embodiments.

Auxiliary execution block 194 is configured to obtain the full addresses from issue select logic 208, and provide them to register file 210, which in turn reads operand data associated with the full address, and provides the operand data to execution unit 214. Execution unit 214 may be implemented as a number of different types of execution units, e.g., floating point units, fixed point units, or specialized execution units such as graphics processing units, encryption/decryption units, coprocessors, XML processing units, etc, and still remain within the scope and spirit of the present invention.

Execution unit 214 performs some operation on this operand data e.g., addition, subtraction, division, etc, depending on the type of instruction issued from issue select logic 208. Execution unit 214 provides the resultant target data 212 from the operation to register file 210, where it is stored internally at a location associated with a full address obtained from issue select logic 208.

In a multithreaded design consistent with the invention, one group 200 of instruction decode logic 202, address calculation logic 300, and dependency logic 204 exists for each thread in the design. Alternatively, other embodiments may be implemented in a single threaded design, where only a single thread is issued to one group 200 of instruction decode logic 202, address calculation logic 300, and dependency logic 204, and only one group 200 exists in the design.

Figure 4:
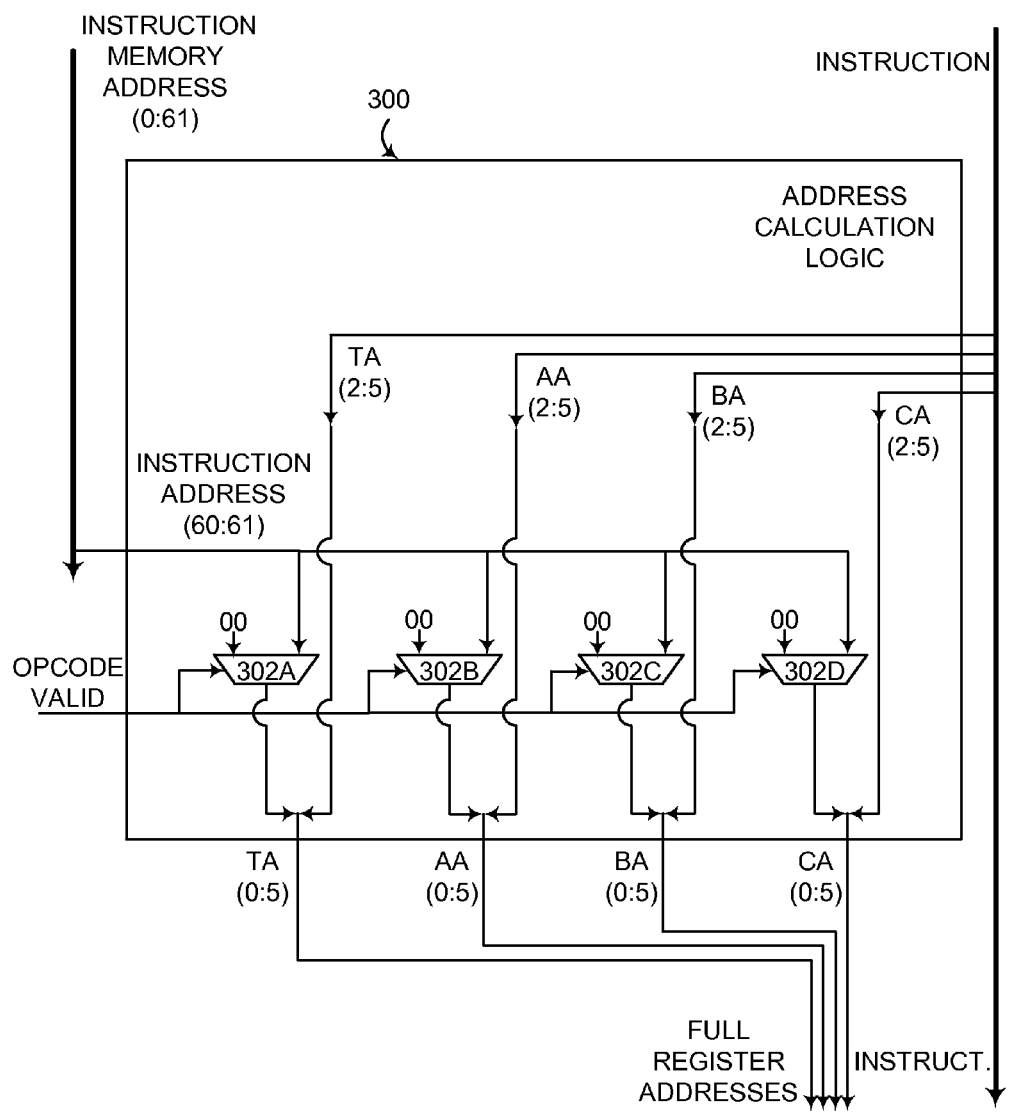
FIG. 4 is a block diagram of an address calculation logic consistent with the invention, and capable of being implemented within the processor of FIG. 2.

FIG. 4 illustrates in further detail address calculation logic 300, previously shown in FIG. 3. This particular embodiment of address calculation logic 300 is designed to obtain the two least significant bits of the current instruction's instruction address (numbered 60:61) and concatenate those two bits onto the most significant portion of each register address portion (each numbered 2:5) contained in the current instruction. In the illustrated embodiment, the register address portions contained in the instruction are 4 bits each, and when each of these address portions are concatenated with the least 2 significant bits of the instruction address, this yields a 6-bit full address denoted as bits 0:5 which are suitable for addressing the 64 registers in the register file.

In the illustrated embodiment, four register address portions are obtained from the instruction. The instruction contains target address portion TA(2:5), and three source register address portions named AA(2:5), BA(2:5) and CA(2:5). Bits 60:61 of the instruction address are sent to multiplexers 302A, 302B, 302C and 302D. These multiplexers are configured to select instruction address 60:61 to be passed to each multiplexers output if the opcode valid from instruction decode logic 202 is 1, indicating that the current instruction is an instruction that requires the least significant portion of the instruction address to be concatenated with address portions from the instruction to yield full register addresses. If the opcode valid is 0, "00" is passed to the output of multiplexers 302A, 302B, 302C and 302D.

The outputs of multiplexers 302A, 302B, 302C and 302D are then concatenated onto the most significant end of register address portions TA(2:5), AA(2:5), BA(2:5) and CA(2:5), respectively. This yields full register addresses TA(0:5), AA(0:5), BA(0:5), and CA(0:5) which are sent to dependency logic 204.

Figure 5:
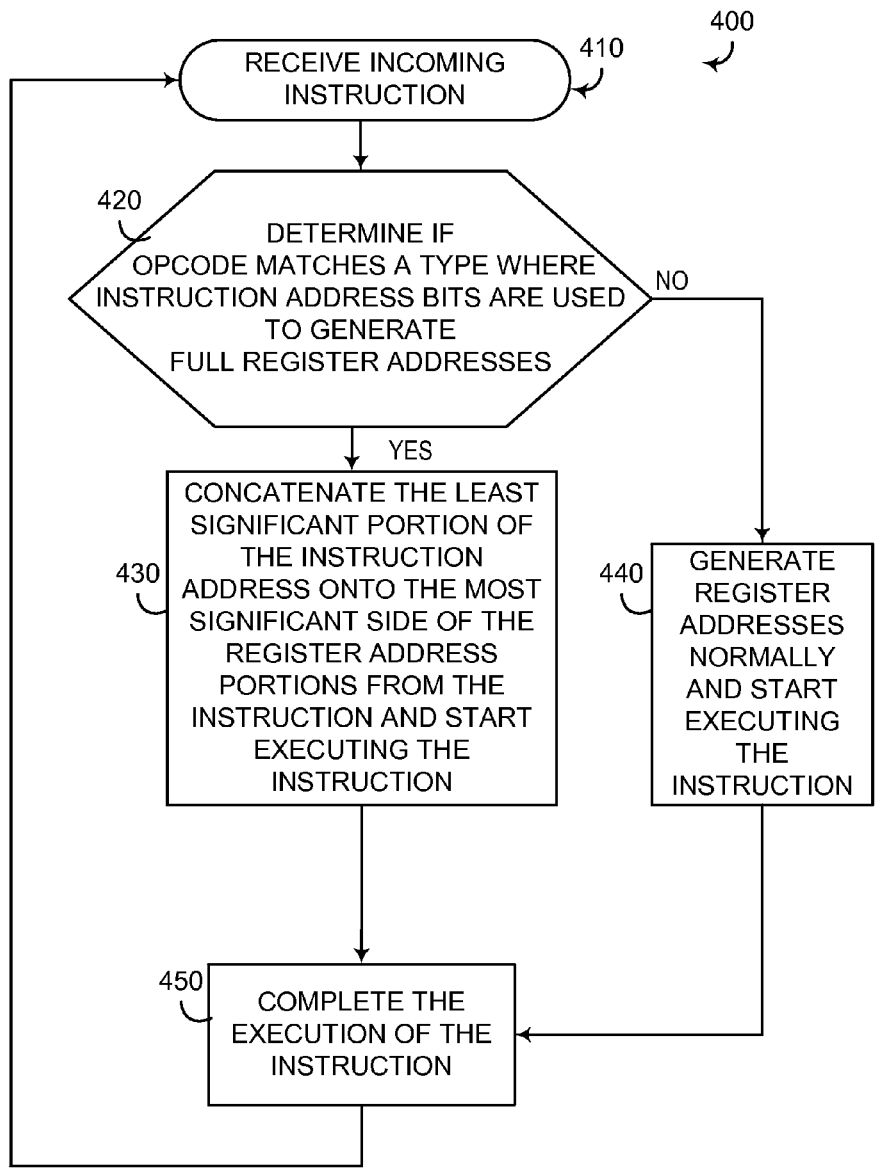
FIG. 5 is a flow chart illustrating an exemplary sequence of operations performed by the auxiliary instruction issue and execution logic of FIG. 3 to implement register address calculation using current instruction address consistent with the invention.

FIG. 5 illustrates a method 400 outlining a sequence of operations performed by auxiliary execution unit 166 when processing an instruction from an instruction stream, and supporting register address calculation using the current instruction address consistent with the invention. With this sequence of operations, the instruction is received in block 410. Control then passes to block 420, where a determination is made as to whether the instruction type of the incoming instruction is of the type that contains any address portions in place of full register addresses, as supported by an execution unit supporting register address calculation using the current instruction address consistent with the invention. If not, control passes to block 440, where the register addresses are generated normally. Control then passes to block 450 where execution of the instruction is completed, and finally control passes back to block 410 to receive the next incoming instruction in the instruction stream.

If a determination is made in block 420 that the current instruction is of the type that contains address portions in lieu of full addresses for use in address calculation using the current instruction address consistent with the invention, then control passes to block 430, where a least significant portion of the current instruction address is concatenated onto the most significant end of each register address portion contained in the instruction, yielding full register addresses, which are then used to read entries from the register file and start executing the instruction. Control then passes to block 450, where the execution of the instruction is completed, and control passes back to block 410 to receive the next incoming instruction in the instruction stream.

Figure 6:
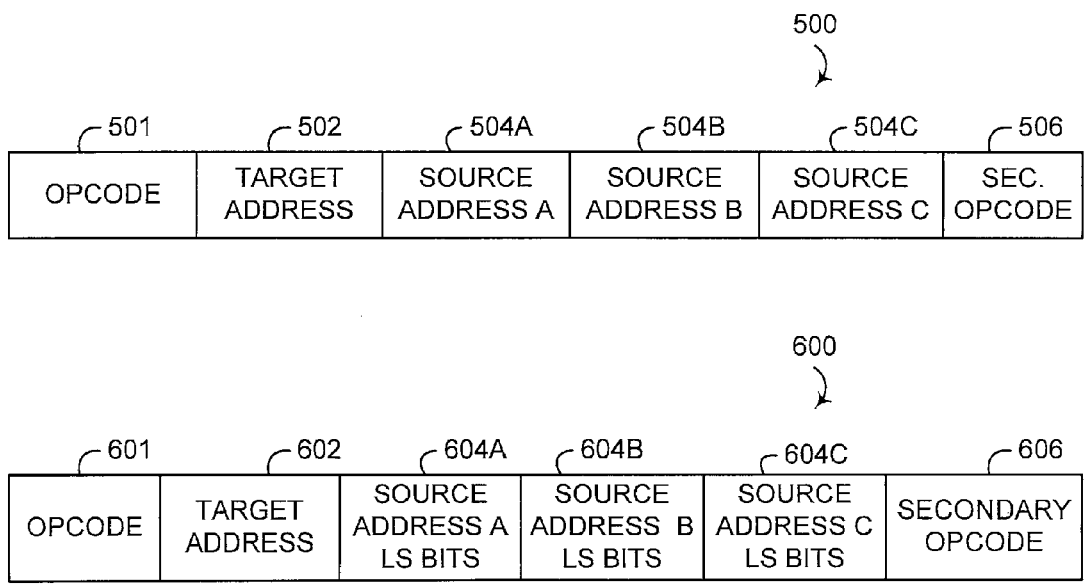
FIG. 6 is an illustration of two instruction formats, the first instruction format suitable for execution by a prior art computing system, and the second suitable to be executed by an AXU Auxiliary Execution unit consistent with the embodiment shown in FIGS. 1-5.

FIG. 6 illustrates at 500 an exemplary instruction format able to be executed by AXU 166. Instruction format 500 contains 32 bits where the bits include an instruction opcode 501 consisting of 6 bits, a 6-bit target address 502, three 6-bit source addresses 504A, 504B and 504C, and a 2-bit secondary opcode 506. As discussed previously, the 2-bit opcode 506 limits the instruction type to only 4 subtypes of operations, yet typically many more are needed.

FIG. 6 also illustrates at 600 an exemplary instruction format supporting register address calculation using the current instruction address and able to be executed by AXU 166 and method 400 consistent with the invention. Instruction format 600 contains 32 bits where the bits include an instruction opcode 601 consisting of 6 bits, a 6-bit target address 602, and three source register portions 604A, 604B, and 604C consisting of 4 bits each. In addition, instruction format 600 contains secondary opcode 606 which is 8 bits. The wider secondary opcode 606 allows for a far greater number of instruction subtypes.

The 4-bit source address portions 604A, 604B and 604C may each be used to be supplied as address portions to the address calculation logic 300 in FIG. 4. In this manner, the source address portions from the instruction may be used to produce full register addresses by concatenating each register address portion from the instruction with the least significant bits from the instruction address.

Instruction format 600 may contain any number and combination of source address portions versus full source addresses and not depart from the scope of the invention. For instance, in place of source portion 604A a full 6-bit register address may be used, reducing the number of available bits in the secondary opcode 606 to 6 bits. Opcodes such as opcode 601 and secondary opcode 606 in the instruction specify which source operands in the instruction are referenced by register addresses directly and which require address calculation by address calculation logic 300. It should be also bet noted that the fixed instruction width may be something other than 32 bits, for instance 64 bits, and not depart from the scope or spirit of the invention Embodiments of the present invention may be implemented within the hardware and software environment described above in FIGS. 1-6. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Other modifications will be apparent to one of ordinary skill in the art having the benefit of the instant disclosure. Therefore, the invention lies in the claims hereinafter appended.

What is claimed is:

1. A computer system, comprising:
   a register file configured to store a target result operand and to retrieve a source operand both addressed by register addresses;
   an execution unit for executing instructions, the execution unit configured to receive the source operand from the register file and write the target result operand into the register file;
   register address calculation logic configured to receive a current instruction address portion of a current instruction address associated with a current instruction, a source register address portion and a target register address portion, and to concatenate the current instruction address portion onto the source register address portion and the target register address portion to yield a full source register address corresponding to the source operand and a full target register address corresponding to the target result operand, and to provide the full source register address and the full target register address to the register file; and
   instruction decode logic configured to decode the current instruction and provide the current instruction address portion and the source and target register address portions to the register address calculation logic;
   wherein the instruction decode logic is configured to provide an opcode valid indication to the register address calculation logic, the opcode valid indication indicating that the current instruction requires the current instruction address portion to be concatenated onto the source and target register address portions to yield full register addresses,
   wherein the register address calculation logic is configured to receive the opcode valid indication from the instruction decode logic, and provide the opcode valid indication to a first multiplexer, the first multiplexer being functionally coupled at a first input to a logic value "00", and at a second input to the two least significant bits of the current instruction address, wherein the output of the first multiplexer is concatenated onto the most significant end of the target register address portion, yielding the full target register address, and
   wherein the first multiplexer is further configured to pass the logic value "00" to its output when the opcode valid indication is false, and configured to pass the two least significant bits of the current instruction address to its output when the opcode valid indication is true.

2. The computer system of claim 1, wherein the register address calculation logic is configured to concatenate the current instruction address portion onto the most significant end of the source register address portion.

3. The computer system of claim 2, wherein the source and target register address portions are each 4 bits.

4. A computer system, comprising:
   a register file configured to store a target result operand and to retrieve a source operand both addressed by register addresses;
   an execution unit for executing instructions, the execution unit configured to receive the source operand from the register file and write the target result operand into the register file;
   register address calculation logic configured to receive a current instruction address portion of a current instruction address associated with a current instruction, a source register address portion and a target register address portion, and to concatenate the current instruction address portion onto the source register address portion and the target register address portion to yield a full source register address corresponding to the source operand and a full target register address corresponding to the target result operand, and to provide the full source register address and the full target register address to the register file; and
   instruction decode logic configured to decode the current instruction and provide the current instruction address portion and the source and target register address portions to the register address calculation logic;
   wherein the instruction decode logic is configured to provide an opcode valid indication to the register address calculation logic, the opcode valid indication indicating that the current instruction requires the current instruction address portion to be concatenated onto the source and target register address portions to yield full register addresses,
   wherein the register address calculation logic is configured to receive the opcode valid indication from the instruction decode logic, and provide the opcode valid indication to a first multiplexer, the first multiplexer being functionally coupled at a first input to a logic value "00", and at a second input to the two least significant bits of the current instruction address, wherein the output of the first multiplexer is concatenated onto the most significant end of the source register address portion, yielding the full source register address, and
   wherein the first multiplexer is further configured to pass the logic value "00" to its output when the opcode valid indication is false, and configured to pass the two least significant bits of the current instruction address to its output when the opcode valid indication is true.

* * * * *